United States Patent
Frankenhauser et al.

(10) Patent No.: US 7,518,549 B2
(45) Date of Patent: Apr. 14, 2009

(54) CIRCUIT ARRANGEMENT FOR PROCESSING SATELLITE SIGNALS

(75) Inventors: Tobias Frankenhauser, Emerkingen (DE); Richard Geissler, Weissenhorn (DE); Reinhard Oelmaier, Laupheim (DE); Meik Wilhelm Widmer, Elchingen (DE)

(73) Assignee: Atmel Germany GmbH, Heilbronn (DE)

( * ) Notice: Subject to any disclaimer, the term of this patent is extended or adjusted under 35 U.S.C. 154(b) by 0 days.

(21) Appl. No.: 11/850,649

(22) Filed: Sep. 5, 2007

(65) Prior Publication Data
US 2008/0074316 A1 Mar. 27, 2008

Related U.S. Application Data

(60) Provisional application No. 60/842,046, filed on Sep. 5, 2006.

(51) Int. Cl.
*G01S 1/02* (2006.01)
(52) U.S. Cl. .............................. 342/357.06; 342/357.01
(58) Field of Classification Search ............ 342/357.01, 342/357.06, 357.12, 357.17, 374; 340/539.3; 455/277.1
See application file for complete search history.

(56) References Cited

U.S. PATENT DOCUMENTS

| 2002/0075165 | A1* | 6/2002 | Yoshioka et al. ............. 340/901 |
| 2006/0017518 | A1* | 1/2006 | Wilcox ....................... 331/185 |
| 2007/0174698 | A1* | 7/2007 | Bailey et al. ................. 714/22 |
| 2008/0129588 | A1* | 6/2008 | Lundgren et al. ...... 342/357.06 |

\* cited by examiner

*Primary Examiner*—Dao L Phan
(74) *Attorney, Agent, or Firm*—Muncy, Geissler, Olds & Lowe, PLLC

(57) ABSTRACT

A circuit arrangement is provided for processing satellite signals comprising a first circuit part, which is made as a processor for computing position and/or speed signals from satellite signals, a second circuit part, which is made as a real-time clock to provide a time signal, at least two voltage sources, which are provided to supply at least one circuit part, and switching means, which are provided for switching the supply of at least one circuit part between the first voltage source and the second voltage source. According to an embodiment, the switching means have at least one voltage monitor with a bandgap voltage reference circuit to determine a switching voltage. The circuit arrangement can be used for GPS-supported navigation systems.

15 Claims, 2 Drawing Sheets

CIRCUIT ARRANGEMENT FOR PROCESSING SATELLITE SIGNALS

This nonprovisional application claims priority to U.S. Provisional Application No. 60/842,046, which was filed on Sep. 5, 2006, and is herein incorporated by reference.

BACKGROUND OF THE INVENTION

1. Field of the Invention

The present invention relates to a circuit arrangement for processing satellite signals comprising a first circuit part, which is made as a processor for computing position and/or speed signals from satellite signals, a second circuit part, which is made as a real-time clock to provide a time signal, at least two voltage sources, which are provided to supply at least one circuit part, and switching means, which are provided for switching the supply of at least one circuit part between the first voltage source and the second voltage source, to a system with a circuit arrangement of this type, and to a method for operating a system of this type.

2. Description of the Background Art

A circuit arrangement known from being commercially available is set up for processing high-frequency electromagnetic satellite signals, which are emitted by satellites in orbit. The circuit arrangement is used, for example, in a receiver for a global positioning system (GPS receiver). The task of the circuit arrangement is substantially to process the encoded signals from satellites in such a way that position and/or time and/or speed signals can be made available for further processing, for example, by a navigation system. Because satellite signals are typically very weak signals, amplification with a low-noise amplifier (LNA) and signal conditioning are provided before the supplying of the encoded signals in the circuit arrangement. The amplified satellite signal is used as the input signal for a radio frequency semiconductor component (RF chip), which is provided for the conditioning of the input signal. The conditioned satellite signal is then provided for further processing to the circuit arrangement.

GPS receivers are used for GPS devices, which are configured as mobile handheld units or as built-in devices, for example, for navigation systems in vehicles, airplanes, or ships. Particularly during use of the GPS receiver in a mobile handheld unit such as a portable navigation system, supplying of the GPS receiver with electrical power typically occurs from several, mutually supplementary voltage sources. These voltage sources have different storage capacities for electrical power.

A first voltage source is provided for a normal mode of the GPS receiver and provides a sufficient amount of power for a prolonged time. Thus, in a normal mode, position and/or time and/or speed signals can be determined from satellite signals. In a normal mode of the GPS receiver, components such as the low-noise amplifier, the RF chip, and an oscillator, which provides a clock frequency, are turned on.

A second voltage source, which has a considerably lower storage capacity for electrical power than the first voltage source, in contrast, is designed only for a basic operation (sleep mode/shut-down mode), in which only data maintenance in the circuit arrangement is to be assured. No provisions are made for operation of the other components of the GPS receiver with the second voltage source. To switch between the two voltage sources and between the aforementioned operating modes, the circuit arrangement is assigned switching means. The switching means assure that a normal mode of the GPS receiver can occur with a sufficient supply voltage of the first voltage source. If the supply voltage of the first voltage source is too low, a switching is carried out by the switching means in the basic operation, to ensure the maintenance of data and/or settings in the circuit arrangement. As soon as the first voltage source is again provided with a sufficient supply voltage, the switching means can activate the normal mode automatically or if there is a turn-on command, which can be triggered by a user of the GPS receiver.

The switching between the normal mode and the basic state must be made by the switching means at a time when a minimum voltage and thereby a still sufficient amount of power can be provided by the first voltage source, to be able to perform an orderly switching. Otherwise, undefined switching states can occur in the GPS receiver, which can cause undesirable output signals from the circuit arrangement. A switching voltage, which is above the minimum voltage, is therefore established for the switching means.

SUMMARY OF THE INVENTION

It is therefore an object of the present invention to provide a circuit arrangement, a system with a circuit arrangement of this type, and a method for operating a system of this type, to enable improved energy utilization.

The circuit arrangement of the aforementioned type includes a switch, which is provided with at least one voltage monitor with a bandgap voltage reference circuit to determine the switching voltage. The voltage monitor has the task of monitoring the supply voltage provided by the first voltage source and if a sufficient supply voltage is present, which is also designated as the switching voltage, to assure a supply by the first voltage source. In realizing the voltage monitor with a bandgap voltage reference circuit, an especially precise, almost temperature-independent reference voltage is provided, which enables an especially precise determination of the switching voltage or supply voltage. In prior-art switching means, only an imprecise reference voltage is provided, which is why a large interval must be maintained between the switching voltage and the minimum voltage, to avoid falling below the minimum voltage.

Whereas prior-art switches enable determination of the switching voltage only with a tolerance above 0.3 V, the switching means of the invention can determine the switching voltage with an accuracy of less than 0.1 V, so that a voltage range larger by 0.2 V for the supply voltage can be utilized.

With the precise reference voltage of the bandgap voltage reference circuit, according to the invention, the switching voltage can be close to the minimum voltage, because an exact determination of the supply voltage is possible. Thus, the storage capacity of the first voltage source can be better utilized, without there being the risk of falling below the minimum voltage.

It is provided in a further embodiment of the invention that one voltage monitor is assigned to at least one circuit part, which is provided with a bandgap voltage reference circuit for determining a supply voltage. The voltage monitor, which can be connected in particular to a reset terminal of the circuit part, makes possible a precise determination of the supply voltage for the circuit part. If the values fall below a predefinable minimal supply voltage, the voltage monitor can change the signal level of an input signal for the circuit part. For example, an orderly shutting down of an integrated circuit can be carried out thereby.

An embodiment of the invention provides that the switching means have at least one voltage regulator for providing a predefinable supply voltage to at least one circuit part. To assure a correct function of the at least one circuit part, the supply voltage for the circuit part must be within a predefined interval. Because the supply voltage of the voltage source can vary within a range that can exceed at least one limit of the interval, a voltage regulator is provided, which adjusts the supply voltage provided by the voltage source to the interval suitable for the circuit part. A low-dropout [LDO] voltage regulator can be used in particular as a voltage regulator, therefore a voltage regulator with a minimum voltage drop of less than 1 V. An especially energy-efficient voltage regulation for the supply voltage can be carried out thereby.

A further embodiment of the invention provides that the first circuit part, the second circuit part, and the switching means are implemented on a common semiconductor substrate as an integrated circuit. In this way, an especially advantageous adjustment of the switching means to the circuit parts can be realized. The switching means constructed with a bandgap voltage reference circuit can be adjusted precisely to the needs and the minimal supply voltages of the circuit parts. This makes possible an especially advantageous utilization of the storage capacities of the voltage sources.

A further embodiment of the invention provides that an output signal of the voltage regulator is applied via a voltage monitor at a reset input of the circuit part and that the voltage monitor has a bandgap voltage reference circuit. The task of a reset input of a circuit part is to deactivate the circuit part in an orderly manner, when the supply voltage drops below a predefinable minimum voltage. The deactivation should occur as long as a sufficient supply voltage is still applied to the circuit part. The voltage monitor assigned to the reset input of the circuit part is therefore set to a switching voltage, which is selected slightly higher than the minimum supply voltage for the circuit part. This can assure that with a slow decline in the supply voltage, first the values drop below the switching voltage of the voltage monitor, which is assigned to the reset input. If the values fall below this switching voltage, the supply voltage is turned off at the reset input whereas the supply voltage is still applied at the supply input of the circuit part. If this voltage combination is present, the circuit part is deactivated in an orderly manner.

The available supply voltage can be precisely determined at the reset input of the circuit part with the use of a bandgap voltage reference circuit for the voltage monitor. As a result, a turning off of the circuit part can occur close to the point when the minimal supply voltage is reached. As a result, the storage capacity of the voltage source, particularly the storage capacity of the second voltage source, can be better utilized.

Another embodiment of the invention provides that the switching means are designed in such a way that when the supply of the second circuit part is switched to the second voltage source, the first circuit part is separated from the first voltage source. This assures that the first circuit part, which has a high current consumption, does not lead to a total draining of the second voltage source. Preferably, the turning off of the first circuit part is assured by a fixedly defined logical linkage with the supply voltage of the first voltage source, so that a forced shut down occurs as soon as there is no supply voltage.

The object of the invention according to a second aspect is achieved by a system, which comprises at least one circuit arrangement according to any one of claims 1 through 6 and an antenna unit for receiving satellite signals, an amplifier circuit for amplifying the satellite signals, a conditioning circuit for the satellite signals, and an oscillator circuit for providing a clock frequency to the first circuit part. Satellite signals can be received and processed with this type of system and provided as position and/or time and/or speed signals for further processing. An especially advantageous utilization of the storage capacities of the first and second voltage source is possible with the use of the circuit arrangement of the invention. A longer operating time with the same storage capacities of the voltage sources can be assured thereby in the system of the invention compared with a prior-art system.

A further embodiment of the invention provides that the first circuit part has at least one activation line, which for control of the amplifier circuit and/or the conditioning circuit is provided with an activation signal that can be output by the first circuit part. Thereby, the first voltage circuit depending on a predefinable operating mode enables a turning on or off of the amplifier circuit and/or the conditioning circuit. The functions of the amplifier circuit and the conditioning circuit are necessary to determine position and/or time and/or speed signals. In other operating modes, these components are not necessary and can therefore be shut down to reduce current consumption.

A further embodiment of the invention provides that the second circuit part has at least one activation line, which for control of the oscillator circuit is provided with an activation signal that can be output by the second circuit part. Thereby, the second voltage circuit depending on a predefinable operating mode enables a turning on or off of the oscillator circuit. The oscillator circuit provides the clock frequency for the clock frequency-controlled processor. Operating the oscillator circuit is only necessary, when the processor is to perform computational operations.

It is provided in another embodiment of the invention that the activation line is ANDed with an output signal of the switching means in such a way that control of the oscillator circuit can occur only in the simultaneous presence of the output signal of the switching means and of the activation signal of the second circuit part. This assures that the oscillator circuit can be supplied exclusively by the first voltage source. Only in the simultaneous presence of the output signal of the switching means, which also causes a switching to the first voltage source, and of the activation signal of the second circuit part at the AND gate is there a signal combination present that makes it possible to supply the oscillator circuit.

The object of the invention according to a third aspect is achieved by a method in which different operating modes can be assumed depending on the supply voltages and depending on internal switching states of the second circuit part. Thereby, depending on the supply voltage of the voltage sources and depending on the need to provide position and/or time and/or speed signals a selective turning on or off of individual circuit parts or components of a GPS receiver can be carried out. An advantageous effect on current consumption for the circuit arrangement or for the GPS receiver can be realized by this means.

It is provided in a further embodiment of the invention that in a normal mode the supply voltage of the first voltage source is applied by the switching means at the at least two circuit parts and activation signals are provided by the circuit parts to the first and second activation lines, in order to activate the amplifier circuit, the conditioning circuit, and the oscillator circuit and to enable determination of position and/or time and/or speed signals from satellite signals. Thereby in the normal mode, the circuit arrangement and the components of the GPS receiver are completely supplied with current and the provision of position and/or time and/or speed signals is enabled.

A further embodiment of the invention provides that in a power-saving mode the supply voltage of the first voltage source is applied by the switching means at the at least two circuit parts and an activation signal is provided by the first circuit part to the first activation line, in order to activate the oscillator circuit and to enable the performance of computations in the first circuit part. In the power-saving mode, in contrast to the normal mode, the amplifier circuit and the conditioning circuit are not supplied. Thus, a saving of current can be realized; receiving of satellite signals is not possible in the power-saving mode. For example, computations or random evaluations of already received satellite position data can be performed when the oscillator circuit and the first circuit part are supplied with the supply voltage.

Another embodiment of the invention provides that in a resting mode, the supply voltage of the first voltage source is applied by the switching means at the at least two circuit parts, whereby without the clock frequency of the oscillator circuit the first circuit part is in a resting state, from which a rapid start in the power-saving mode or normal mode can occur. In the resting mode, because of the absence of clock frequency of the oscillator circuit, no computations can be performed in the first circuit part. Because the supply voltage is applied at the first circuit part, the parameters and values stored in the processor are retained and are available for a rapid start. The stored parameters are helpful in order to go from the resting mode to the normal mode and to be able to output a position and/or time and/or speed signal. The parameters in fact over the course of time and imprecisely with a change in the position of the GPS receiver nevertheless enable a rough orientation for the rapid start. Thereby, a valid position and/or time and/or speed signal can be provided for further processing from the resting mode even after a short time, preferably within less than 20 seconds.

Another embodiment of the invention provides that in a sleep mode the supply voltage of the second voltage source is applied by the switching means at the second circuit part and that in the second circuit part information from the first circuit part is temporarily stored, which, when a sufficient supply voltage of the first voltage source is present, can be provided for a rapid activation of the first circuit part. In the sleep mode, no supply voltage is applied at the first circuit part, and the data stored in the first circuit part are lost when they were not stored temporarily in the second voltage part. In the sleep mode, there is only a very low current consumption, because only the second circuit part is supplied with voltage. Therefore, information from the first circuit part, which is stored temporarily in the second circuit part, can be stored for a long time period also with a small storage capacity of the second voltage source. The information stored in the second circuit part is only a small part of the information that can be stored and processed in the first circuit part. Together with the time signal of the real-time clock provided in the second circuit part, this small amount of information, however, can assure a rapid transition from the sleep mode to the normal mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
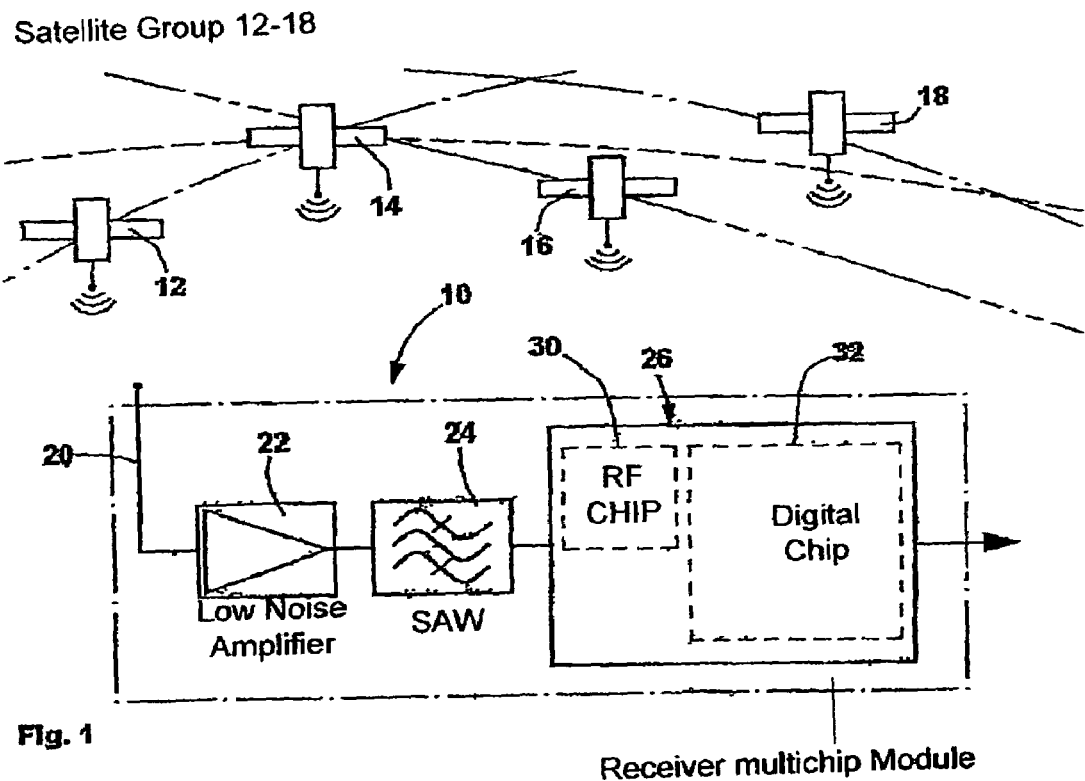
FIG. 1 is a schematic diagram of a GPS receiver unit, which is provided for use in a satellite navigation system.

FIG. 1 schematically shows a GPS receiver unit 10, which is provided for receiving of signals of several satellites 12 to 18, which are located in different orbits. Satellites 12 to 18 emit encoded signals, which can be differentiated from one another, are typically transmitted at a frequency of 1.575 GHz, and can be received by an antenna 20 of GPS receiver unit 10. Antenna 20 is connected to a low-noise amplifier 22 (LNA), which amplifies the weak signals of satellites 12 to 18 and is set up in such a way that it does not cause the deterioration of the signal-to-noise ratio of the satellite signal or causes only a slight deterioration. The amplified satellite signal is filtered with the use of a surface acoustic wave filter 24 (SAW filter), which acts as a bandpass filter, and is then transmitted further as an input signal for a receiver/multi-chip module 26. Receiver/multichip module 26 has a radio frequency semiconductor component or RF chip 30, which is provided for conditioning the input signal. Provided furthermore on the receiver/multi-chip module 26 is a digital semiconductor structural element or digital chip 32, which undertakes the further processing of the conditioned input signal.

RF chip 30 has a receiver 36 and a clock generator 38. Receiver 36 is provided for preprocessing the satellite signals amplified by LNA 22. Clock generator 38 is designed to provide a first clock frequency. Digital chip 32 has a first circuit part made as processor 40, which is shown in greater detail in FIG. 2, and a second circuit part which is made as time measuring device 42.

Figure 2:
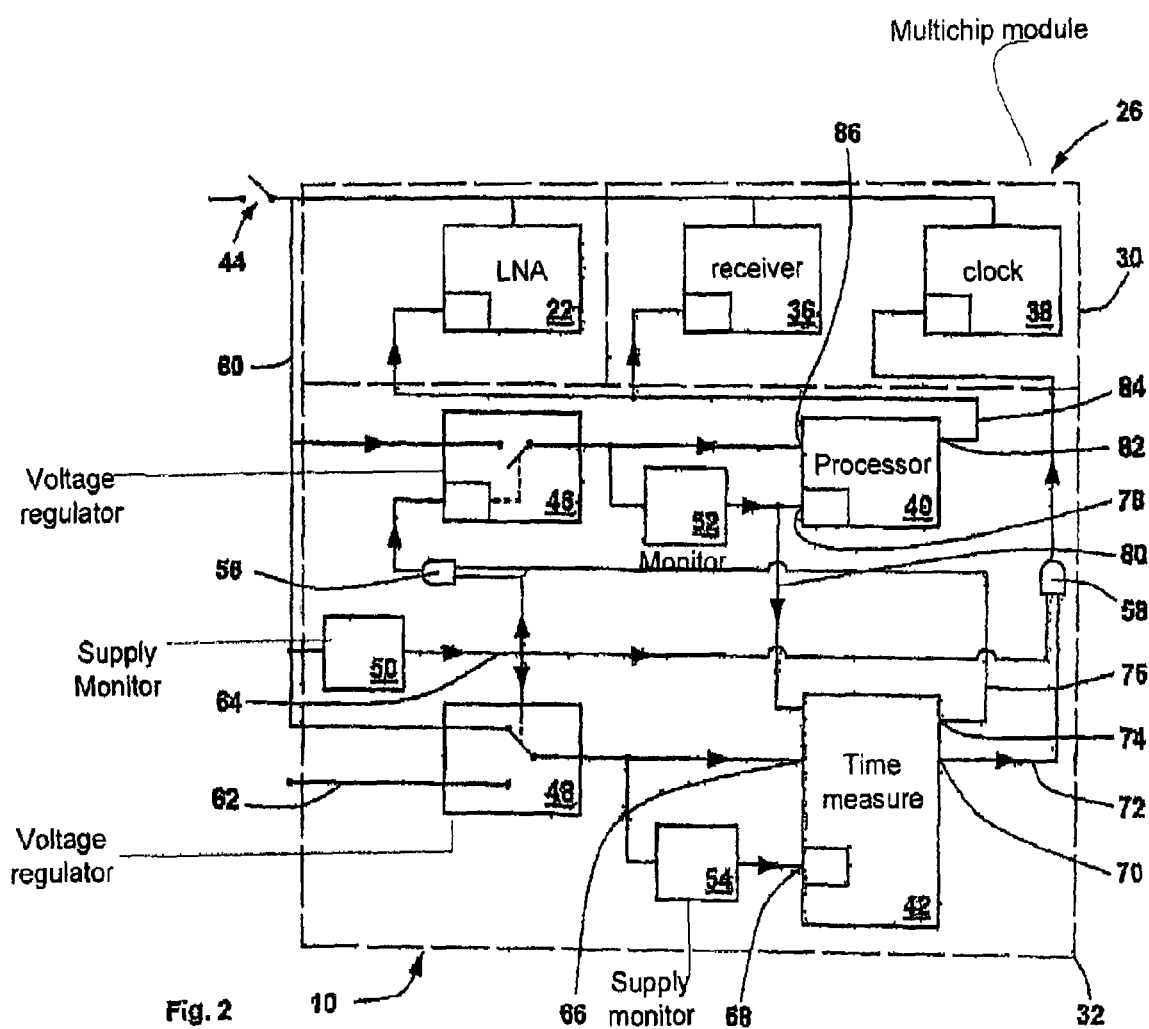
FIG. 2 is a block diagram of a GPS receiver according to FIG. 1.

The circuit parts shown in the block diagram of FIG. 2 are connected to one another by supply or signal lines, which schematically show the relationships between the individual circuit parts. The supply or signal lines are provided with direction arrows, which symbolize an effective direction of the supply voltages or switching signals transmittable over the supply or signal lines. A first voltage source is applied at a first supply line 60 to provide a supply voltage Vcc. First supply line 60 can be interrupted with a switch 44. It is connected directly to LNA 22, receiver 36, and clock generator 38. In addition, the supply voltage Vcc can be applied via voltage regulator 46 at the processor 40 and via voltage regulator 48 at time measuring device 42. A first supply monitor 50 made as a voltage monitor is looped between first supply line 60 and a first signal line 64.

The supply voltage Vbat of the second voltage source is applied at a second supply line 62, which is connected directly to second voltage regulator 48.

Figure 3:
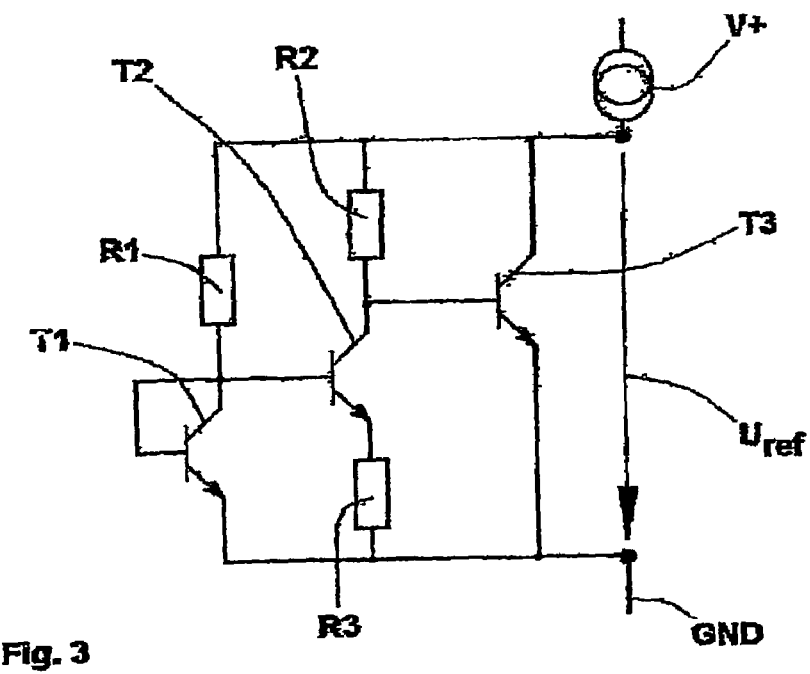
FIG. 3 is a schematic drawing of a bandgap voltage reference circuit.

First supply monitor 50 is made with a bandgap voltage reference circuit, shown in greater detail in FIG. 3, and is provided for providing the supply voltage Vcc at signal line 64. As long as the supply voltage Vcc in supply line 60 does not exceed the predefined voltage value, first supply monitor 50 blocks and does not provide signal line 64 with the supply voltage Vcc.

Without the supply voltage Vcc in signal line 64, second voltage regulator 48 is in a starting position and both AND gates 56 and 58 are blocked. In the starting position of voltage regulator 48, the supply voltage Vbat of the second voltage source is applied via supply line 62 at supply terminal 66 of time measuring device 42 and at supply monitor 54. As long as the supply voltage Vbat is above a predefined voltage value, supply monitor 54 provides a signal voltage at reset input 68 of time measuring device 42. When the supply voltage Vbat is applied at supply terminal 66 and at reset terminal 68, the time measuring device operates and can generate a time signal and can store data. If the supply voltage Vbat drops below the predefined voltage value controlled by supply monitor 54, supply monitor 54 blocks, as a result of which the voltage at reset input 68 is absent and time measuring device 42 is shut down in a controlled manner.

As soon as the supply voltage Vcc exceeds the predefined voltage value, supply monitor 50 provides the supply voltage Vcc in signal line 64. As a result, second voltage regulator 48 is activated and switches from the second voltage source to the first voltage source. The supply voltage of the first current source is thereby applied at supply terminal 66 and at supply monitor 54 and at time measuring device 42, so that this is operated. In addition, the supply voltage Vcc is provided via signal line 64 to the first and second AND gates 56, 58.

The task of supply monitor 54 is to assure that with a declining supply voltage (regardless of which voltage source provides the supply voltage) first the voltage at the reset input 68 drops, to enable thereby an orderly shutting down of time measuring device 42.

With the supply voltage Vcc being provided at AND gates 56 and 58, activation signals can be provided at first voltage regulator 46 or at clock generator 38. Time measuring device 42 provides switching signals for this at signal outputs 70 and 74, which are connected via signal lines 72 and 76 to AND gates 56, 58. An activation signal for clock generator 38 leads immediately to its activation, so that this directly outputs a clock frequency. An activation signal for voltage regulator 46 has the effect that this regulator applies the supply voltage Vcc at a supply input 86 of processor 40 and at a supply monitor 52 assigned to processor 40. With a sufficient supply voltage, supply monitor 52 switches the supply voltage Vcc to reset input 78 of processor 40 and thereby enables the operation of processor 40. The supply voltage Vcc at the reset input 78 is fed back via signal line 80 to time measuring device 42, so that time measuring device 42 has information whether processor 40 is or is not in operation.

Processor 40 has a signal output 82, which via a signal line 84 can transmit an activation signal to LNA 22 and to receiver 36. These are turned on when the activation signal is present and turned off when there is no activation signal.

By applying the supply voltage Vcc and by providing the switching signals and the activation signals, various operating modes can be set for the circuit parts of GPS receiver unit 10.

In the normal mode, the supply voltage Vcc is applied at supply line 60 and is provided via supply monitor 50 to signal line 64. Voltage regulator 48 switches through the supply voltage Vcc, so that Vcc is applied at supply terminal 66 and via supply monitor 54 at reset input 68 and at both AND gates 56 and 58. Time measuring device 42 provides switching signals at signal outputs 70 and 74, which are fed via signal lines 72 and 76 to AND gates 56, 58. Because in each case a high signal level is applied at both inputs of AND gates 56 and 58, the switching signals can be relayed further to voltage regulator 46 and clock generator 36. Clock generator 36 is turned on immediately when Vcc is applied and supplies a clock frequency for processor 40. Voltage regulator 46 switches Vcc to supply input 86 of processor 40. Processor 40 via signal output 82 and signal line 84 provides an activation signal for LNA 22 and for receiver 36. A receiving and processing of satellite position data can thereby be carried out in GPS receiver unit 10.

In the power-saving mode, in contrast to the normal mode, no activation signal of the processor is provided at signal output 82, so that no activation, i.e., no turning on of LNA 22 and receiver 36, occurs. As a result, satellite signals cannot be received. The clock frequency of clock generator 38 is applied at processor 40, so that the processor can perform computational operations with satellite signals or evaluations of already determined satellite signals.

In the resting mode, in contrast to the normal mode, neither an activation signal of processor 40 is provided at signal output 82, nor is a switching signal provided by time measuring device 42 at signal output 70. Thereby, AND gate 58 blocks and the supply voltage Vcc cannot be relayed further in signal line 64 to clock generator 38. As a result, there is no clock frequency for processor 40 and it pauses in a frozen state, in which all determined data and parameters are retained and held ready for a restart of processor 40.

In the sleep mode, the supply voltage Vcc is not sufficient for switching through supply monitor 50. No input signal from signal line 64 is thereby applied at voltage regulator 48 and voltage regulator 48 switches the supply voltage Vbat of the second current source to supply terminal 66 of the time measuring device. Because signal line 64 has no input signal, AND gates 56 and 58 regardless of the switching signals in signal lines 72 and 76 cannot output any switching signals to voltage regulator 46 or clock generator 38. Thus, the second voltage source exclusively supplies time measuring device 42, in which a real-time clock continues to run and optionally data from processor 40 are stored temporarily.

A highly simplified embodiment of a bandgap voltage reference circuit, which is only used to explain the principle, is shown in FIG. 3. A base terminal of a transistor T1 is connected via a resistor R1 to the supply voltage and has the same potential as a collector terminal of transistor T1 and as a base terminal of a transistor T2. Because of the small dimensioned resistor R1, transistor T1 functions with a relatively high collector current. The collector current through transistor T2 is about 10 times lower than the collector current through transistor T1, because resistor R2 is greater by the factor of 10 than resistor R1. The difference voltage of the two base-emitter threshold voltages of transistors T1 and T2 is across R3.

When transistors T1 and T2 have high current amplifications, the voltage across resistor R2 is amplified proportional to the voltage across resistor R3. A transistor T3 functions as an amplifier stage and regulates the output voltage between collector and emitter to a value that consists of its base-emitter threshold voltage and the voltage drop across R2. The base-emitter threshold voltage of T3 has a negative temperature coefficient, whereas the voltage drop across R2 has a positive temperature coefficient. The voltage across the reference element is temperature compensated, when the sum of both voltages is equal to the so-called power-bandgap voltage. The difference voltage has a temperature coefficient of about +2 mV/K, whereas the base-emitter voltage of transistor T3 has a coefficient of −2 mV/K. Thus, both temperature coefficients increase and the bandgap reference voltage circuit produces a reference voltage of about 1.25 V.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit arrangement for processing satellite signals, the arrangement comprising:
    a first circuit part, which is made as a processor for computing position and/or speed signals from satellite signals;

a second circuit part, which is made as a real-time clock to provide a time signal, at least two voltage sources, which are provided to supply at least one circuit part; and a switch, which switches a supply of at least one circuit part between the first voltage source and the second voltage source, wherein the switch has at least one voltage monitor with a bandgap voltage reference circuit to determine a switching voltage.

2. The circuit arrangement according to claim 1, wherein a voltage monitor, which is provided with a bandgap voltage reference circuit for determining a supply voltage, is assigned to at least one circuit part.

3. The circuit arrangement according to claim 1, wherein the switch has at least one voltage regulator for providing a predefinable supply voltage to at least one circuit part.

4. The circuit arrangement according to claim 3, wherein an output signal of the voltage regulator is applied via a voltage monitor at a reset input of the circuit part and wherein the voltage monitor has a bandgap voltage reference circuit.

5. The circuit arrangement according to claim 1, wherein the first circuit part, the second circuit part, and the switch are implemented on a common semiconductor substrate as an integrated circuit.

6. The circuit arrangement according to claim 1, wherein the switch is designed in such a way that when the supply of the second circuit part is switched to the second voltage source, the first circuit part is separated from the first voltage source.

7. A system comprising:
an antenna unit for receiving satellite signals;
an amplifier circuit for amplifying the satellite signals;
a conditioning circuit for filtering the satellite signals;
at least one circuit arrangement comprising:
  a first circuit part, which is made as a processor for computing position and/or speed signals from satellite signals;
  a second circuit part, which is made as a real-time clock to provide a time signal, at least two voltage sources, which are provided to supply at least one circuit part; and
  a switch, which switches a supply of at least one circuit part between the first voltage source and the second voltage source, the switch having at least one voltage monitor with a bandgap voltage reference circuit to determine a switching voltage; and
an oscillator circuit for providing a clock frequency to the first circuit part.

8. The system according to claim 7, wherein the first circuit part has at least one activation line, which for control of the amplifier circuit and/or the conditioning circuit is provided with an activation signal that is outputted by the first circuit part.

9. The system according to claim 7, wherein the second circuit part has at least one activation line, which for the control of the oscillator circuit is provided with an activation signal that is outputted by the second circuit part.

10. The system according to claim 9, wherein the activation line is ANDed with an output signal of the switch in such a way that control of the oscillator circuit can occur only in the simultaneous presence of the output signal of the switch and of the activation signal of the second circuit part.

11. The system for operating a system according to claim 7, wherein different operating modes are assumed depending on supply voltages and depending on internal switching states of the second circuit part.

12. The system according to claim 11, wherein, in a normal mode, the supply voltage of the first voltage source is applied by the switch at the at least two circuit parts and activation signals are provided by the circuit parts to the first and second activation lines, in order to activate the amplifier circuit, the conditioning circuit, and the oscillator circuit and to enable determination of position and/or time and/or speed signals from satellite signals.

13. The system according to claim 11, wherein, in a power-saving mode, the supply voltage of the first voltage source is applied by the switch at the at least two circuit parts and an activation signal is provided by the first circuit part to the first activation line, in order to activate the oscillator circuit and to enable the performance of computations in the first circuit part.

14. The system according to claim 11, wherein in a resting mode the supply voltage of the first voltage source is applied by the switch at the at least two circuit parts, wherein without the clock frequency of the oscillator circuit, the first circuit part is in a resting state from which a rapid start in the power-saving mode or normal mode can occur.

15. The system according to claim 11, wherein in a sleep mode the supply voltage of the second voltage source is applied by the switching means at the second circuit part and wherein in the second circuit part information from the first circuit part is temporarily stored, which when a sufficient supply voltage is present of the first voltage source can be provided for a rapid activation of the first circuit part.

* * * * *